United States Patent [19]
Yagi et al.

[11] Patent Number: 4,808,641
[45] Date of Patent: Feb. 28, 1989

[54] CONCRETE ADMIXTURE

[75] Inventors: Hideo Yagi; Toru Takeuchi, both of Sakura, Japan

[73] Assignee: Fujisawa Pharmaceutical Co., Ltd., Osaka, Japan

[21] Appl. No.: 73,145

[22] Filed: Jul. 14, 1987

[30] Foreign Application Priority Data

Jul. 31, 1986 [JP] Japan ................................. 61-182881

[51] Int. Cl.$^4$ ............................................. C04B 24/00
[52] U.S. Cl. ........................................ 524/5; 524/136; 524/376; 524/377; 524/558; 106/90; 106/314
[58] Field of Search ..................... 106/90, 314, 315; 524/5, 558, 376, 377, 136, 140, 141, 156, 158; 526/317.1

[56] References Cited

FOREIGN PATENT DOCUMENTS

| 58-74552 | 5/1983 | Japan | 524/5 |
| 60-217277 | 10/1985 | Japan | 524/558 |
| 61-1113639 | 5/1986 | Japan | 524/558 |
| 61-1174211 | 8/1986 | Japan | 526/317.1 |

Primary Examiner—William R. Dixon, Jr.
Assistant Examiner—Ann M. Knab
Attorney, Agent, or Firm—Oblon, Fisher, Spivak, McClelland & Maier

[57] ABSTRACT

The invention relates to an admixture to be used in preparing a fresh concrete with enhanced flowability and air-entraining property.

4 Claims, No Drawings

CONCRETE ADMIXTURE

This invention relates to a concrete admixture to be used in preparing a fresh concrete for the purpose of maintaining its flowability and air entraining property at an adequate level.

Among the compounds used for the purpose of increasing the flowability of a fresh concrete, there is known a copolymer prepared by polymerizing 10 to 95 parts by weight of a compound of the general formula:

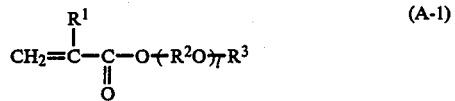   (A-1)

wherein $R^1$ is hydrogen or methyl, $R^2$ is lower(C2 to C4) alkylene, $R^3$ is hydrogen or a lower(C1 to C5) alkyl and $l$ is an integer of 1 to 100, and 90 to 5 parts by weight of a compound of the general formula:

   (A-2)

wherein $R^4$ is hydrogen or methyl, or a salt thereof. Such a copolymer (hereinafter referred to as "copolymer X") is disclosed in Japanese Patent Publication No. 59-18338.

As described later, addition of the above copolymer to a fresh concrete improves the flowability thereof on the one hand, causes entrainment of a large volume of air which forms coarse air voids or bubbles into the resultant concrete on the other hand, and accordingly, unfavorable results are recognized in reduced strength and markedly reduced resistance to freezing and thawing in the resultant concrete.

As a result of the inventors' intensive investigations made in an attempt to solve the above problems, they found that the flowability of a fresh concrete can be increased and at the same time air can be entrained, air bubbles of which are appropriate in size and, as a result, a concrete structure superior in strength and resistance to freezing and thawing can be obtained when component A comprising copolymer X defined above, component B comprising a compound of the general formula:

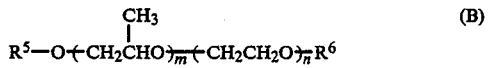   (B)

wherein $R^5$ is hydrogen or alkanoyl, $R^6$ is hydrogen or alkyl, m is an integer of 1 to 99 and n is an integer of 1 to 15, and further wherein m+n is an integer of 2 to 100 and the units

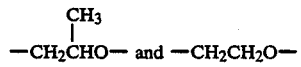

appear randomly, and component C comprising at least one compound selected from the group consisting of polyoxyethylene alkyl ether sulfate or polyoxyethylene alkylphenyl ether sulfate or a salt thereof, polyoxyethylene alkyl ether phosphate or polyoxyethylene alkylphenyl ether phosphate or a salt thereof, and alkylbenzenesulfonic acid or a salt thereof are added to a fresh concrete.

The present invention has been completed based on the above finding.

A concrete to which a concrete admixture according to the invention is applicable includes all fresh concrete basically composed of cement, water and aggregates, with, for instance, an appropriate water reducing agent optionally added for the purpose of reducing the quantity of water per unit volume of concrete.

As the cement, there may be mentioned cement currently on the market, such as ordinary portland cement, high-early-strength cement, moderate heat cement, blast-furnace slag cement and flay ash cement, and further cement mentioned above partly replaced with fly ash, granulated slag powder, siliceous admixtures and the like.

The aggregates include fine ones (e.g. sand, etc.) and coarse ones (e.g. gravel, pebbles, crushed stone, etc.).

The lower alkylene for $R^2$ may include lower alkylene having 2 to 4 carbon atoms, suitable examples of which are ethylene, methylethylene, dimethylethylene and the like.

The lower alkyl for $R^3$ may include lower alkyl having 1 to 5 carbon atoms, suitable examples of which are methyl, ethyl, propyl, isopropyl, butyl, isobutyl, pentyl, isopentyl and the like.

The integer $l$ may preferably be within the range of 1 to 25.

The alkanoyl for $R^5$ may include alkanoyl having 1 to 30 carbon atoms, preferably 12 to 24 carbon atoms, suitable examples of which are dodecanoyl, tridecanoyl, tetradecanoyl, pentadecanoyl, hexadecanoyl, heptadecanoyl, octadecanoyl, nonadecanoyl, icosanoyl, henicosanoyl, docosanoyl, tricosanoyl, tetracosanoyl and the like.

The alkyl for $R^6$ may include alkyl having 1 to 30 carbon atoms, preferably 12 to 24 carbon atoms, suitable examples of which are dodecyl, tridecyl, tetradecyl, pentadecyl, hexadecyl, heptadecyl, octadecyl, nonadecyl, icosyl, henicosyl, docosyl, tricosyl, tetracosyl and the like.

The integers m and n are preferably within the range of 10 to 60 and 2 to 6, respectively, and further m+n is preferably within the range of 12 to 66.

Copolymer X may have a molecular weight of 500 to 50,000, preferably 10,000 to 30,000.

Referring to component C, polyoxyethylene alkyl ether sulfate and polyoxyethylene alkylphenyl ether sulfate can be represented by the general formula:

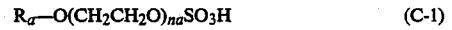   (C-1)

wherein $R_a$ is alkyl having 5 to 20 carbon atoms or phenyl substituted with alkyl containing 5 to 20 carbon atoms, and na is an integer of 1 to 10.

In the above general formula (C-1), the alkyl for $R_a$ may be alkyl having 8 to 15 carbon atoms or phenyl substituted with alkyl having 8 to 15 carbon atoms, suitable examples of which are octyl, nonyl, decyl, undecyl, dodecyl, tridecyl, tetradecyl, pentadecyl, octylphenyl, nonylphenyl, decylphenyl, undecylphenyl, dodecylphenyl, tridecylphenyl, tetradecylphenyl, pentadecylphenyl and the like.

The integer na may preferably be 2 to 5.

The salts of compounds (C-1) may include inorganic and organic salts such as alkali metal salts (e.g. sodium salt, potassium salt, etc.) alkaline earth metal salts (e.g. calcium salt, magnesium salt, etc.), ammonium salt, ethanolamine salts (monoethanolamine salt and diethanolamine salt, triethanolamine salt), and the like, suitable examples of which are ethanolamine salts, most preferably, triethanolamine salts.

The polyoxyethylene alkyl ether phosphate and polyoxyethylene alkylphenyl ether phosphate can be represented by the general formula:

   (C-2)

wherein $R_b{}^1$ is a group of the formula $R_b{}^4$—O—(CH$_2$CH$_2$O)$_{nb}$—, in which $R_b{}^4$ is alkyl having 4 to 18 carbon atoms or phenyl substituted with alkyl having 4 to 18 carbon atoms and nb is an integer of 1 to 15, and $R_b{}^2$ and $R_b{}^3$ are each hydroxy or a group of the formula $R_b{}^4$—O—(CH$_2$CH$_2$O)$_{nb}$—, in which $R_b{}^4$ and nb are each as defined above.

The alkyl for $R_b{}^4$ may preferably be alkyl having 6 to 12 carbon atoms or phenyl substituted with alkyl having 6 to 12 carbon atoms, suitable examples of which are hexyl, heptyl, octyl, nonyl, decyl, undecyl, dodecyl, hexylphenyl, heptylphenyl, octylphenyl, nonylphenyl, decylphenyl, undecylphenyl, dodecylphenyl and the like.

The integer of nb may preferably be 2 to 10.

As the salts of compounds (C-2), there may be mentioned the same ones as given as examples of the salts of compounds (C-1). Among them preferred are sodium salts and ethanolamine salts.

The alkylbenzenesulfonic acids are represented by the general formula:

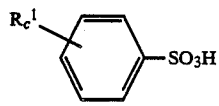   (C-3)

wherein $R_c{}^1$ is alkyl containing 8 to 20 carbon atoms.

In the above formula, the alkyl for $R_c{}^1$ may be alkyl having 10 to 15 carbon atoms, suitable examples of which are decyl, undecyl, dodecyl, tridecyl, tetradecyl, pentadecyl and the like.

As the salts of compounds (C-3), there may be mentioned the same ones as mentioned for the salts of compounds (C-1), suitable examples of which are sodium salts.

The mixing ratio among the components A, B and C may vary depending on the proportions of fresh concrete components (cement, water and aggregate) and/or the presence or absence of a water reducing agent, but may preferably be such that component A accounts for 90 to 95 by weight, component B for 0.05 to 5 parts by weight and component C for 0.01 to 10 parts by weight.

The concrete admixture thus obtained is generally added to fresh concrete in an amount per cement of 0.001 to 1.0 percent by weight (hereinafter the term "percentage (%)" always means percentage by weight), preferably 0.001 to 0.2%. But the amount may vary depending on the desired level of flowability of a fresh concrete, the proportions of components, the presence or absence of a water reducing agent and/or the time of addition.

A concrete admixture according to the invention is added to a fresh concrete by a conventional method. Thus, it may be added to mixing water on the occasion of concrete mixing, during concrete mixing, or to a fresh concrete once mixed up. Furthermore, it may be added to a fresh concrete after arrival thereof at the site of construction by means of a concrete mixer truck.

Addition of a concreteadmixture according to the invention to a fresh concrete results in maintenance of adequate levels of flowability and air-entraining property, but does not cause entrainment of coarse air bubbles in large amounts as encountered when copolymer X alone is added, hence will not cause marked decrease in strength or resistance to freezing and thawing of the resultant concrete.

Now, in order to show the effects of the present invention, the freezing and thawing test data of the resultant concrete which was prepared by adding a concrete admixture according to the invention.

TEST

Freezing and Thawing Test of Concrete (1) Test method:

(i) Preparation of concrete specimens:

In a room, the temperature of which is 20±2° C., a 50-liter tilting mixer was charged in sequence with a coarse aggregate (hereinafter referred to as "G"), half the amount of a fine aggregate (hereinafter referred to as "S"), cement (hereinafter referred to as "C"), half the amount (remainder) of S, and, as necessary, a water reducing agent and part of component C of a concrete admixture to be tested, followed by addition of water (hereinafter referred to as "W") containing (the remainder of) the components of the concrete admixture in the case of simultaneous addition. The subsequent 3-minute mixing gave a fresh concrete.

In the case of delayed addition, water charging and 30-second mixing were followed by addition of the components of the concrete admixture to be tested. The subsequent mixing for 2 minutes and a half gave a fresh concrete.

Thus obtained fresh concrete was placed in a formwork for concrete specimen preparation (10 cm×10 cm×40 cm) and allowed to harden, whereby a concrete specimen for use in the freezing and thawing test was obtained.

Materials used:
C: ordinary portland cement (specific gravity 3.16)
S: river sand [specific gravity 2.63, FM (fineness modulsu) 2.71]
G: crushed stone (specific gravity 2.67, FM 6.70)

(ii) Concrete formation:
Concrete formation is shown in Table 1.

TABLE 1

| Concrete formulation | Concrete formulations | | | | | |
|---|---|---|---|---|---|---|
| | W/C (%) | s/a (%) | W (kg) | C (kg) | S (kg) | G (kg) |
| I | 53.4 | 48 | 171 | 320 | 868 | 955 |
| II | 50.0 | 48 | 160 | 320 | 881 | 969 |

(s/a: sand-coarse aggregate ratio)

(iii) Components tested:
Component A:

Copolymer, in sodium salt form, prepared by polymerizing 40 parts by weight of a compound of the general formula (A-1), in which $R^1$ and $R^3$ are each methyl, $R^2$ is ethylene and l is 9, and 60 parts by weight of a compound of the general formula (A-2), in which $R^4$ is methyl, and having a molecular weight of about 20,000, the viscosity of a 40% aqueous solution thereof being 200 cps.

Component B:
Compound of the general formula (B), in which $R^5$ is stearoyl, $R^6$ is hydrogen, m is 35 and n is 5, the molecular weight being about 2,500.

Component C:
C-A: sodium dodecylbenzenesulfonate.
C-B: mixture of equal amounts of a compound, in ethanolamine salt form, of the general formula (C-2), in which $R_b^1$ and $R_b^2$ are each

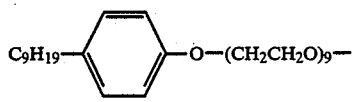

and $R_b^3$ is hydroxy, and a compound, in ethanolamine salt form, of the general formula (C-2), in which $R_b^1$ is

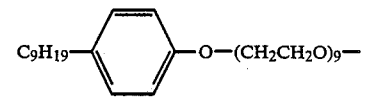

and $R_b^2$ and $R_b^3$ are each hydroxy.
C-C:

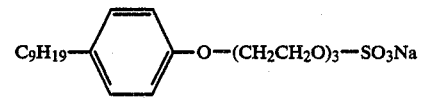

Water reducing agent:
D-A: calcium ligninsulfonate
D-B: sodium gluconate
Methods of testing concrete:
Test for slump: method of JIS A 1101
Test for air content: method of JIS A 1128
Freezing and thawing test:
After water curing (20° C.) of the concrete specimen until the age of 2 weeks, the test was performed by the method of JIS A 6204. Air void spacing factor measurement was performed by the linear traverse method as described in ASTM C457-82.

(2) Test results:
The results obtained are shown in Tables 2 and 3.

TABLE 2

| | | | Details of concrete formulation | | | | | | | |
|---|---|---|---|---|---|---|---|---|---|---|
| | | | WRA added | | added with WCA | Test compound added (%/C) | | | | |
| | Concrete | Method of | D-A | D-B | C-A | | | Component C | | |
| No. | formulation | addition | (%/C) | (%/C) | (%/C) | Component A | Component B | C-A | C-B | C-C |
| 1 | — | — | — | — | — | — | — | — | — | — |
| 2 | I | simultaneous | — | — | — | 0.135 | — | — | — | — |
| 3 | I | simultaneous | — | — | — | 0.135 | 0.00162 | 0.003 | — | — |
| 4 | I | simultaneous | — | — | — | 0.135 | 0.00162 | — | 0.009 | — |
| 5 | II | — | 0.12 | 0.03 | 0.002 | — | — | — | — | — |
| 6 | II | delayed | 0.12 | 0.03 | 0.002 | 0.135 | 0.00162 | 0.001 | — | — |
| 7 | II | delayed | 0.12 | 0.03 | 0.002 | 0.135 | 0.00162 | — | 0.003 | — |
| 8 | II | delayed | 0.12 | 0.03 | 0.002 | 0.135 | 0.00162 | — | — | 0.0006 |
| 9 | II | — | — | 0.05 | 0.003 | — | — | — | — | — |
| 10 | II | delayed | — | 0.05 | 0.003 | 0.135 | 0.00162 | 0.0003 | — | — |
| 11 | II | delayed | — | 0.05 | 0.003 | 0.135 | 0.00162 | — | 0.002 | — |

WRA: water reducing agent

TABLE 3

| | | | Results | | | |
|---|---|---|---|---|---|---|
| | | | Air void system in concrete | | Resistance of concrete to freezing and thawing | |
| No. | Slump (cm) | Air content (%) | Air void spacing factor (μm) | Average air void diameter (μm) | Relative dynamic modulus of elasticity (%) | Number of cycles |
| 1 | 8.0 | 5.0 | 191 | 195 | 98 | 300 |
| 2 | 20.0 | 6.7 | 335 | 340 | 53 | 105 |
| 3 | 20.0 | 5.2 | 252 | 291 | 93 | 300 |
| 4 | 20.0 | 5.3 | 247 | 270 | 97 | 300 |
| 5 | 8.5 | 5.1 | 220 | 279 | 97 | 300 |
| 6 | 19.0 | 5.0 | 242 | 289 | 96 | 300 |
| 7 | 19.0 | 5.1 | 257 | 264 | 97 | 300 |
| 8 | 19.0 | 4.7 | 273 | 305 | 84 | 200 |
| 9 | 8.0 | 4.8 | 208 | 243 | 97 | 300 |
| 10 | 19.0 | 4.7 | 227 | 270 | 95 | 300 |
| 11 | 19.0 | 5.1 | 235 | 263 | 93 | 300 |

As is evident from Table 3 given above, the addition of component A alone for the purpose of increasing the flowability of a fresh concrete causes remarkable decrease in resistance of the resultant concrete to freezing and thawing and the concrete fails to meet the ordinary requirement that the relative dynamic modulus of elasticity after 200 freeze-thaw cycles should be at least 80%. On the contrary, the addition of a concrete admixture according to the invention does not cause any decrease in resistance to freezing and thawing at all irrespective of whether a water reducing agent is combinedly used or not.

This is clearly supported by the fact that the air void spacing factor and average air void diameter in the air void system of the concrete obtained by adding component A alone to a fresh concrete are extremely large.

EXAMPLE 1

A concrete admixture composed of 93 parts by weight of a copolymer, in sodium salt form (molecular weight about 20,000, viscosity of 40% aqueous solution 200 cpm), prepared by polymerizing 40 parts by weight of a compound of the general formula (A-1), in which $R^1$ and $R^3$ are each methyl, $R^2$ is ethylene and l is 9, and 60 parts by weight of a compound of the general formula (A-2), in which $R^4$ is methyl, 1 part by weight of a compound of the general formula (B), in which $R^5$ is stearoyl, $R^6$ is hydrogen, m is 35 and n is 5 (molecular weight about 2,500) and 6 parts by weight of a mixture of equal amounts of a compound, in ethanolamine salt form, of the general formula (C-2), in which $R_b{}^1$ and $R_b{}^2$ are each

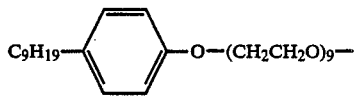

and $R_b{}^3$ is hydroxy, and a compound, in ethanolamine salt form, of the general formula (C-2), in which $R_b{}^1$ is

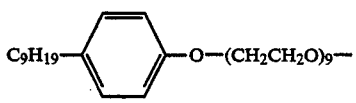

and $R_b{}^2$ and $R_b{}^3$ are each hydroxy.

EXAMPLE 2

A 50-liter tilting mixer was charged with 955 kg of crushed stone, 434 kg of river sand and 320 kg of ordinary portland cement and further with 434 kg of river sand and the mixture was stirred.

Then, 171 kg of water with 470 g of the concrete admixture of Example 1 dissolved therein was added and the whole mass was mixed to give a fresh concrete.

What we claim is:

1. An admixture to be used in preparing a fresh concrete, which comprises 90 to 95 parts by weight of component A comprising a copolymer prepared by polymerizing 10 to 95 parts by weight of a compound of the general formula:

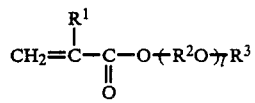

wherein $R^1$ is hydrogen or methyl, $R^2$ is lower(C2 to C4) alkylene, $R^3$ is hydrogen or lower(C1 to C5) alkyl and l is an integer of 1 to 100, and 90 to 5 parts by weight of a compound of the general formula:

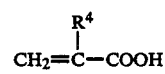

wherein $R^4$ is hydrogen or methyl, or a salt thereof, 0.05 to 5 parts by weight of component B comprising a compound of the general formula:

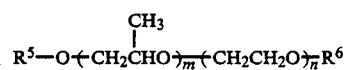

wherein $R^5$ is hydrogen or alkanoyl, $R^6$ is hydrogen or alkyl, m is an integer of 1 to 99 and n is an integer of 1 to 15, and further wherein m+n is an integer of 2 to 100 and the units $$-CH_2\overset{CH_3}{\underset{|}{C}}HO- \quad \text{and} \quad -CH_2CH_2O-$$

appear randomly, and 0.01 to 10 parts by weight of component C comprising at least one compound selected from the group consisting of polyoxyethylene alkyl ether sulfate or polyoxyethylene alkylphenyl ether sulfate or a salt thereof, polyoxyethylene alkyl ether phosphate or polyoxyethylene alkylphenyl ether phosphate or a salt thereof, and alkylbenzenesulfonic acid or a salt thereof.

2. The admixture of claim 1 which comprises 90 to 95 parts by weight of component A, in sodium salt form, comprising a copolymer prepared by polymerizing 10 to 95 parts by weight of a compound of the formula:

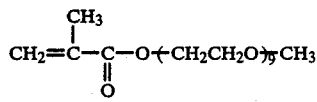

and 90 to 5 parts by weight of a compound of the formula:

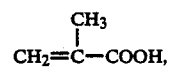

0.05 to 5 parts by weight of component B comprising a compound of the general formula:

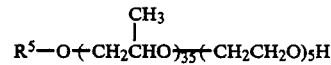

wherein $R^5$ is stearoyl and the units

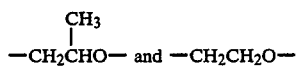

appear randomly, and 0.01 to 10 parts by weight of component C comprising a mixture of equal amounts of a compound, in ethanolamine salt form, of the formula

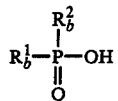

wherein $R_b^1$ and $R_b^2$ are each

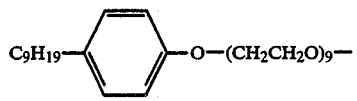

and a compound, in ethanolamine salt form, of the formula

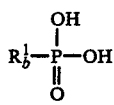

wherein $R_b^1$ is

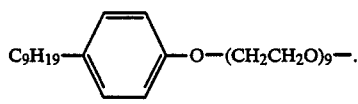

3. A method of preparing a fresh concrete which comprises adding per cement 0.001 to 1.0 percent by weight of a concrete admixture which comprises 90 to 95 parts by weight of component A comprising a copolymer prepared by polymerizing 10 to 95 parts by weight of a compound of the general formula:

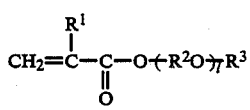

wherein $R^1$ is hydrogen or methyl, $R^2$ is lower(C2 to C4) alkylene, $R^3$ is hydrogen or lower(C1 to C5) alkyl and l is an integer of 1 to 100, and 90 to 5 parts by weight of a compound of the general formula:

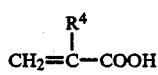

wherein $R^4$ is hydrogen or methyl, or a salt thereof, 0.05 to 5 parts by weight of component B comprising a compound of the general formula:

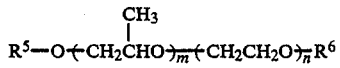

wherein $R^5$ is hydrogen or alkanoyl, $R^6$ is hydrogen or alkyl, m is an integer of 1 to 99 and n is an integer of 1 to 15, and further wherein m+n is an integer of 2 to 100 and the units

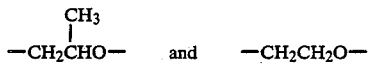

appear randomly, and 0.01 to 10 parts by weight of component C comprising at least one compound selected from the group consisting of polyoxyethylene alkyl ether sulfate or polyoxyethylene alkylphenyl ether sulfate or a salt thereof, polyoxyethylene alkyl ether phosphate or polyoxyethylene alkylphenyl ether phosphate or a salt thereof, and alkylbenzenesulfonic acid or a salt thereof.

4. The method of preparing a fresh concrete of claim 3, in which the concrete admixture is the one which comprises 90 to 95 parts by weight of component A, in sodium salt form, comprising a copolymer prepared by polymerizing 10 to 95 parts by weight of a compound of the formula:

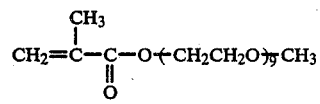

and 90 to 5 parts by weight of a compound of the formula:

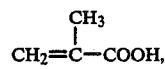

0.05 to 5 parts by weight of component B comprising a compound of the general formula:

wherein $R^5$ is stearoyl and the units

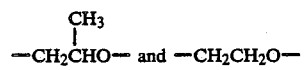

appear randomly, and 0.01 to 10 parts by weight of component C comprising a mixture of equal amounts of a compound, in ethanolamine salt form, of the formula

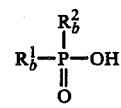

wherein $R_b^1$ and $R_b^2$ are each

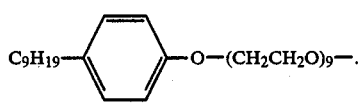

and a compound, in ethanolamine salt form, of the formula

11
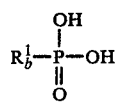
wherein $R_b^1$ is
12
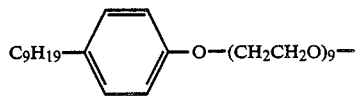
* * * * *